W. A. GRAHAM.
FRICTION BREAKING MEANS FOR CINEMATOGRAPH FILM SPOOLS.
APPLICATION FILED APR. 29, 1919.

1,340,710.

Patented May 18, 1920.

INVENTOR
W. A. Graham.

UNITED STATES PATENT OFFICE.

WALLACE ANDERSON GRAHAM, OF GORE, NEW ZEALAND.

FRICTION BRAKING MEANS FOR CINEMATOGRAPH-FILM SPOOLS.

1,340,710.  Specification of Letters Patent.  Patented May 18, 1920.

Application filed April 29, 1919. Serial No. 293,571.

*To all whom it may concern:*

Be it known that I, WALLACE ANDERSON GRAHAM, a subject of the King of Great Britain, and resident of Gore, in the Dominion of New Zealand, have invented certain new and useful Improvements in Friction Braking Means for Cinematograph-Film Spools, of which the following is a specification.

This invention relates to apparatus whereby moving pictures are shown on a screen, and more particularly to that part of the machine termed the spool upon which the film is wound.

The object of the invention is to provide a check upon the unwinding film spool to prevent over-running when the machine is in motion, and at the same time not to interfere with the steady running of the machine, or to put any undue strain on the film.

A further feature of the invention is the provision of means whereby lateral movement and vibration of the spool is obviated. Cinematograph films are very sensitive to sudden sharp tugs, and are easily damaged owing to most of the wear being on the outside edges of the film, and require to be unwound during exhibition or operation in a steady manner.

In exhibiting operations, the present method of mounting the unwinding spool allows it to over-run because the inertia of the unwinding spool when in motion sometimes tends to unwind the film quicker than the winding spool will receive it, with the result that there is a certain amount of loose film between the unwinding spool and the projecting mechanism, which loose film is overtaken as exhibition progresses. When said slackness of film is totally overcome, a sudden sharp tug or jar to the film spool results, and when this occurs, the edges of the film suffer, sometimes necessitating the cutting off of considerable portions of a valuable film.

My invention obviates these defects, and consists in the novel construction, combination and arrangement of parts, all as hereinafter described, illustrated in the accompanying drawings, and incorporated in the claims.

Figure 1:
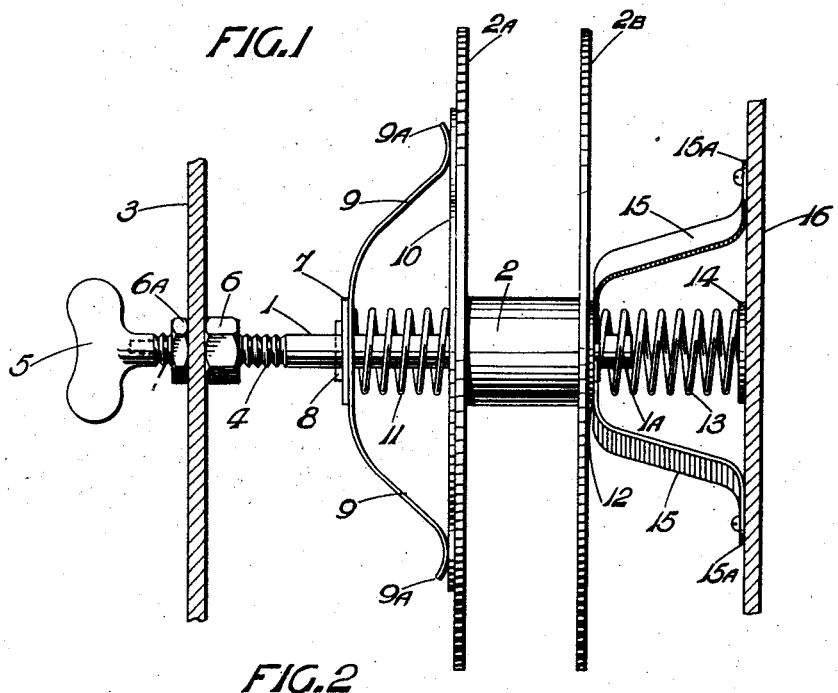
Figure 1 is a front elevation of the invention.
Figure 2:
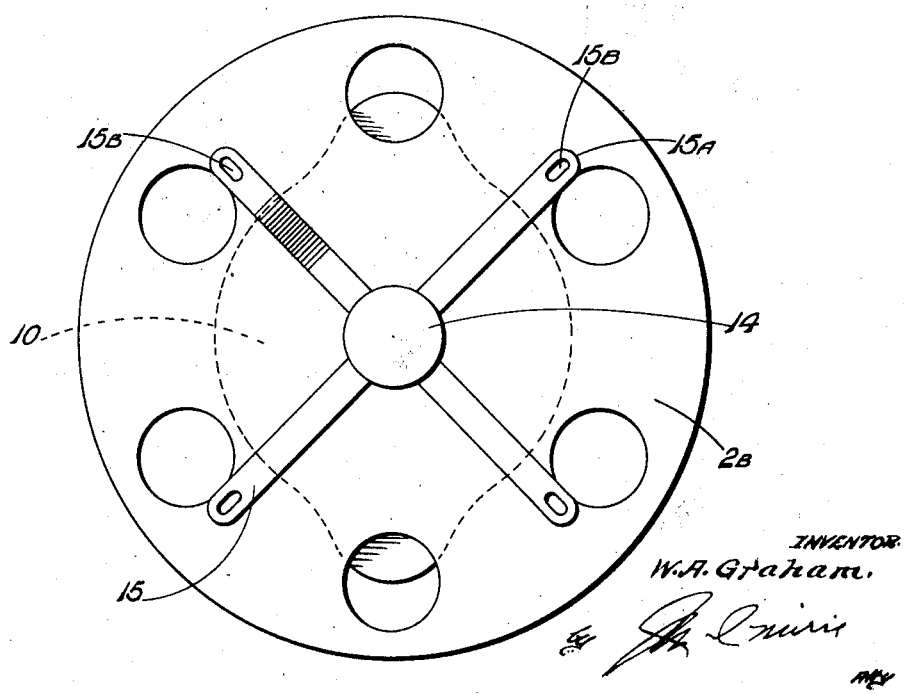
Fig. 2 is a side elevation of the invention.

There is a spindle 1 upon which is mounted a film spool 2, the said spindle is adapted to be passed through the wall 3 of the box containing the motion picture mechanism. One end of the said spindle 1 is threaded as at 4, said threaded portion being adapted to receive a removable turning key member 5 for the purpose of turning the spindle 1. To adjust the said spindle in position lock nuts 6 and $6^A$ are provided and positioned one on each side of the wall 3, the said spindle projecting into the box. A metal washer member 7 is mounted on the spindle 1 and is kept in position and prevented from rotating by a steel pin 8 passing through said spindle 1, and engaging with a groove formed on the face of the washer member 7.

Attached to the washer member 7 is a two armed retention spring member 9 made of any light springy material, and preferably of the form illustrated, the ends $9^A$ of each arm bear against a large leather or fiber friction washer member 10 mounted upon the spindle 1, and lying against the flange $2^A$ of the film spool 2.

A spiral spring 11 is carried on the spindle 1 so that one of its ends will engage with the retention spring member 9, and its other end with the face of the washer member 10.

There is a washer 12 provided made of similar material to the washer 10 and having a metal bearing to house the end $1^A$ of the spool spindle 1, the said washer lying against the flange $2^B$ of the film spool 2. Attached to and projecting in a horizontal plane from said washer member 12 is a spiral spring 13 having its other end attached to a washer 14 made of any suitable material.

Retention arms 15 of suitable light springy material are provided and attached to the washer member 12, said retention arms extend preferably radially from the washer member 12 and are adapted to be adjustably secured to the door 16 of the machine box by means of bolts and nuts, the ends $15^A$ of the said retention members being slotted as at $15^B$ for this purpose.

In operation the spool containing the film to be unwound is mounted upon the spindle 1, the door 16 of the machine box is then closed, bringing the washer 12 into engagement with the face of the flange $2^B$ of the spool 2, the said washer being held there under the influence of the retention arms 15 and spiral spring 13, the slight pressure exerted by these members causes the flange 2^A of the spool 2 to engage with the large washer member 10, which is kept in position by the retention spring member 9 and spiral spring 11 bearing against the washer 7. It will be understood of course that the pressure exerted by the springs 11 and 13 and the retention members 9 and 15 is very light and provision is made for adjusting degrees of tension between the washers 10 and 12 and the flanges of the spool by turning the spindle 1 by the key member 5 and locking in position by the nuts 6 and 6^A.

The joint action of the members before described provides a friction brake sufficient to remedy the fault of the film spool overrunning, while not interfering with the steady running of the machine or putting any undue strain on the film. The provision of the retention spring member 9 in combination with the washer 10 prevents lateral movement and vibration of the film spool.

Various slight modifications or alterations may be made in the details of construction without departing from the essence or scope of the invention.

Having thus described my invention, what I claim as new and desire to secure by Letters Patent is:—

1. A film spool, a spindle on which said spool is rotatably mounted, an adjustable spindle, braking means for one side of the spool carried by the spindle, and braking means for the other side of the spool mounted independently of the spindle.

2. A film spool, an adjustable spindle therefor, a braking means supported by the spindle and arranged to coöperate with one side of the spool, and an independently-movable member and a braking means carried thereby for coöperation with the other side of the spool, said last-named braking means coöperating with the end of the spindle.

3. A non-rotative adjustable spindle, a film spool rotatable on the spindle, a friction disk to bear against one side of the spool, a coil spring bearing between said disk and a stop on the spindle, spring arms carried by the spindle and bearing on the disk adjacent the edge thereof, and braking means manually movable and adapted to coöperate with the opposite side of the spool.

4. A non-rotative adjustable spindle, a film spool rotatable on the spindle, a friction disk to bear against one side of the spool, a coil spring bearing between said disk and a stop on the spindle, spring arms carried by the spindle and bearing on the disk adjacent the edge thereof, and braking means, manually movable, and adapted to coöperate with the opposite side of the spool, said last named braking means also coöperating with the end of the spindle.

5. Friction braking means for cinematograph film spools, comprising in combination with an adjustably mounted spindle and a film spool thereon, a washer member attached to said spindle, said washer forming a rest for a spring retention member, and a spiral spring adapted to engage with a friction washer bearing against the outside surface of one of the flanges of the film spool, a further disk member having attached thereto radially disposed springy arms and a spiral spring, the said springy arms being adapted to be adjustably secured to the wall of the box containing the motion picture mechanism, and the said spiral spring being attached to a disk member adapted to engage with the inside portion of the wall of the film box.

6. Means for preventing the lateral movement and vibration of a cinematograph film spool, comprising an adjustably mounted spindle and a film spool thereon, a washer member attached to said spindle, said washer forming a rest for a spring retention member, and a spiral spring adapted to engage with a friction washer bearing against the outside surface of one of the flanges of the film spool, a further disk member having attached thereto radially disposed springy arms and a spiral spring, the said springy arms being adapted to be adjustably secured to the wall of the box containing the motion picture mechanism, and the said spiral spring being attached to a disk member adapted to engage with the inside portion of the wall of the film box.

In witness whereof I affix my signature.

WALLACE ANDERSON GRAHAM.

Witnesses:
D. M. COCHRANE,
A. L. THOMSON.